United States Patent
Park et al.

(10) Patent No.: US 7,970,234 B2
(45) Date of Patent: Jun. 28, 2011

(54) POST-PROCESSING CIRCUIT FOR PROCESSING AN IMAGE SIGNAL ACCORDING TO FREQUENCY COMPONENTS OF THE IMAGE SIGNAL

(75) Inventors: Sung-cheol Park, Seongnam-si (KR); Jae-hong Park, Seongnam-si (KR); E-woo Chon, Seoul (KR); Mi-kyoung Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1174 days.

(21) Appl. No.: 11/673,132

(22) Filed: Feb. 9, 2007

(65) Prior Publication Data

US 2007/0229710 A1 Oct. 4, 2007

(30) Foreign Application Priority Data

Feb. 9, 2006 (KR) .......... 10-2006-0012577

(51) Int. Cl.
*G06K 9/40* (2006.01)
*G06K 9/38* (2006.01)
*H04N 9/76* (2006.01)
*H04N 5/00* (2011.01)

(52) U.S. Cl. ........ 382/275; 382/254; 382/263; 382/264; 348/596; 348/618

(58) Field of Classification Search .......... 382/254, 382/263, 264, 275; 348/606, 618
See application file for complete search history.

(56) References Cited

U.S. PATENT DOCUMENTS

| | | | | |
|---|---|---|---|---|
| 5,012,333 A * | 4/1991 | Lee et al. | ...... | 358/520 |
| 6,035,071 A * | 3/2000 | Yamada | ...... | 382/263 |
| 6,259,537 B1 * | 7/2001 | Matama | ...... | 358/1.9 |
| 6,445,831 B1 * | 9/2002 | Arai | ...... | 382/254 |
| 7,155,000 B2 | 12/2006 | Heijnen et al. | | |
| 7,164,805 B2 * | 1/2007 | Takahira | ...... | 382/263 |
| 2006/0039622 A1 * | 2/2006 | Casale et al. | ...... | 382/266 |

FOREIGN PATENT DOCUMENTS

KR 1019980046822 A 6/2000
KR 1020020084712 A 11/2002

* cited by examiner

*Primary Examiner* — Brian Q Le
*Assistant Examiner* — Jose M Torres
(74) *Attorney, Agent, or Firm* — F. Chau & Associates, LLC

(57) ABSTRACT

A post-processing circuit for processing an image signal according to frequency components of an image signal includes: a low-frequency extracting unit outputting a low-frequency image component of the image signal as a low-frequency signal; a high-frequency extracting unit multiplying a high-frequency image component of the image signal by a first gain and outputting the multiplication product as a high-frequency signal; an intermediate-frequency extracting unit multiplying an intermediate-frequency image component of the image signal by a second gain and outputting the multiplication product as an intermediate-frequency signal; and an adder adding the low-frequency signal, the high-frequency signal, and the intermediate-frequency signal and outputting the addition sum as a post-processed signal, wherein the first gain and the second gain are differently set according to a pixel location in a spatial domain.

46 Claims, 4 Drawing Sheets

POST-PROCESSING CIRCUIT FOR PROCESSING AN IMAGE SIGNAL ACCORDING TO FREQUENCY COMPONENTS OF THE IMAGE SIGNAL

CROSS-REFERENCE TO RELATED PATENT APPLICATION

This application claims the benefit of Korean Patent Application No. 10-2006-0012577, filed on Feb. 9, 2006, in the Korean Intellectual Property Office, the disclosure of which is incorporated herein in its entirety by reference.

BACKGROUND OF THE INVENTION

1. Technical Field

The present disclosure relates to a post-processing circuit for processing an image signal, and more particularly, to a post-processing circuit for processing an image signal according to frequency components of the image signal.

2. Discussion of Related Art

FIGS. 1A and 1B are block diagrams of a conventional post-processing circuit for eliminating noise from an image signal and sharpening an image corresponding to the image signal.

Referring to FIGS. 1A and 1B, the conventional post-processing circuits 10 and 20 sharpen an image signal after eliminating noise from the image signal. The conventional post-processing circuits 10 and 20, however, may not obtain an effective post-processing result because the noise elimination process and the sharpening process for improving the image quality have conflicting characteristics. That is, the conventional post-processing circuit 10 in FIG. 1A cannot recover high-frequency components of an image signal deleted through the noise elimination process even when the sharpening process is performed. On the other hand, the conventional post-processing circuit 20 in FIG. 1B has a limitation in eliminating noise effectively since the high-frequency components of the image signal are amplified during the sharpening process, which is performed before the noise elimination process is performed.

If an image signal is compressed based on a block-discrete cosine transform (block-DCT), a post-process, such as deblocking/deringing, is required to improve the image quality. That is, if the image signal is compressed based on the block-DCT, a non-continuous artifact may be generated at a block boundary. A ringing artifact is generated in an inside region of the block boundary due to the damaged high-frequency components of the image signal caused by the compression.

Therefore, a post-processing circuit for deblocking and deringing is required in order to post-process an image signal that has been compressed based on the block-DCT. Improved post-processing circuits for noise elimination and sharpening such as those shown in FIGS. 1A and 1B are also required.

SUMMARY OF THE INVENTION

Exemplary embodiments of the present invention provide a post-processing circuit for processing an image signal according to characteristics of the image signal.

Exemplary embodiments of the present invention also provide a post-processing circuit for processing an image signal according to a plurality of post-processing modes with a single circuit structure.

According to an exemplary embodiment of the present invention, there is provided a post-processing circuit for processing an image signal including an original signal and noise components including: a low-frequency extracting unit, a high-frequency extracting unit, an intermediate-frequency extracting unit, and an adder.

The low-frequency extracting unit outputs a low-frequency image component of the image signal as a low-frequency signal. The high-frequency extracting unit multiplies a first gain by a high-frequency image component of the image signal and outputs the multiplication result as a high-frequency signal.

The intermediate-frequency extracting unit multiplies a second gain by an intermediate-frequency image component of the image signal and outputs the multiplication result as an intermediate-frequency signal. The adder adds the low-frequency signal, the high-frequency signal and the intermediate-frequency signal and outputs the addition result as a post-processed signal.

The first gain and the second gain are set differently according to a pixel location in a spatial domain.

The image signal includes an original signal and noise components. The first gain is set to a small value if the energy of a noise component in a high-frequency image component of the image signal is less than the energy of a high-frequency component of the original signal. The image signal is an image signal for a pixel in a flat region of the spatial domain.

The first gain is set to a large value if the energy of the noise component is less than the energy of the high-frequency component of the original signal. The image signal is an image signal for a pixel in a fine region of the spatial domain.

The post-processing circuit may further include a gain calculating unit calculating the first gain. The high-frequency extracting unit preserves the high-frequency image component to have a size corresponding to the first gain. The high-frequency extracting unit includes a subtractor extracting the high-frequency image component by subtracting the low-frequency signal from the image signal and a multiplier outputting the high-frequency signal by multiplying the first gain to the high-frequency image component.

The second gain is set to minimize a sharpening artifact of the image signal. The second gain is set to a constant or is adaptively set to the pixel. The second gain is set in proportional to the first gain if the second gain is to be adaptively set to the pixel.

The intermediate-frequency extracting unit sharpens the image signal. The intermediate-frequency extracting unit includes a high-pass filter outputting the intermediate-frequency image component by high-pass filtering the low-frequency signal; and a multiplier outputting the intermediate-frequency signal by multiplying the second gain to the intermediate-frequency image component.

The low-frequency extracting unit eliminates high-frequency noise of the image signal. The low-frequency extracting unit is a low-pass filter. The low-pass filter uses a filter coefficient that preserves a fine component of the image signal. The filter coefficient is a constant coefficient or adaptive coefficient on the pixel.

According to an exemplary embodiment of the present invention, there is provided a post-processing circuit for processing an image signal having an ongoing signal and noise components including a low-frequency extracting unit, a high-frequency extracting unit and an adder.

The low-frequency extracting unit outputs a low-frequency image component of the image signal as a low-frequency signal. The high-frequency extracting unit multiplies a first gain with a high-frequency image component of the image signal and outputs the product as a high-frequency signal. The adder adds the low-frequency signal and the high-frequency signal and outputs the sum as a post-processed signal.

The first gain is set differently according to a post-processing mode of the image signal and a pixel expressed in a spatial domain. The post-processing mode of the image signal is one of a first mode for eliminating noise of the image signal and a second mode for deblocking/deringing of the image signal.

The post-processing circuit may further include a gain calculating unit. The gain calculating unit outputs a first gain corresponding to one of the first mode and the second mode in response to a mode selection signal. The gain calculating unit includes a multiplexer.

The first gain is set to a first value that decreases the high-frequency image component in the first mode if the energy of a noise component in a high-frequency image component is larger than the energy of a high-frequency component of the original signal. The image signal is an image signal for a pixel in a flat region of the spatial domain.

The first gain is set to a second value that increases the high-frequency image component in the first mode if the energy of the noise component is less than the energy of the high-frequency component of the original signal. The image signal is an image signal for a pixel in a fine region of the spatial domain.

The mode selection signal selects the second mode if the image signal is compressed by a block-DCT (block-discrete cosine transform). The image signal in the second mode is an image signal for a pixel on or inside a block boundary of the spatial domain.

The first gain is set to a first value that decreases the high-frequency image component if the image signal is an image signal for a pixel on the block boundary. The first gain is zero. On the other hand, the first gain is set identically to the first gain in the first mode if the image signal is an image signal for a pixel inside the block boundary.

the post-processing circuit may further include a detecting unit. The detecting unit determines whether the image signal is an image signal for a pixel on the block boundary or an image signal for a pixe in the region inside of the block boundary.

The low-frequency extracting unit may be low-pass filter. The low-pass filter eliminates high-frequency noise of the image signal if the post-processing mode is the first mode.

The filter coefficient is an adaptive coefficient on a pixel in a spatial domain when the post-processing mode is the second mode. The image signal is an image signal for a pixel on or inside a block boundary in the spatial domain when the image signal is compressed by a block-DCT (block-discrete cosine transform).

The low-pass filter uses a filter coefficient that highly smoothes the image signal when the image signal is an image signal for a pixel on the block boundary. The low-pass filter uses a filter coefficient that makes the image signal not cross a fine region of the spatial domain if the image signal expresses a pixel inside the block boundary. The filter coefficient is a constant coefficient or an adaptive coefficient on the pixel.

The post-processing circuit may further include an intermediate-frequency extracting unit multiplying a second gain by an intermediate-frequency image component of the image signal and outputting the product as an intermediate-frequency signal. The second gain minimizes a sharpening artifact of the image signal.

The adder adds the intermediate-frequency signal to the sum of the low-frequency signal and the high-frequency signal.

BRIEF DESCRIPTION OF THE DRAWINGS

Exemplary embodiments of the present invention will be understood in more detail from the following descriptions taken in conjunction with the attached drawings in which.

DETAILED DESCRIPTION OF EXEMPLARY EMBODIMENTS

The present invention will now be described more fully with reference to the accompanying drawings, in which exemplary embodiments of the invention are shown.

Figure 2:
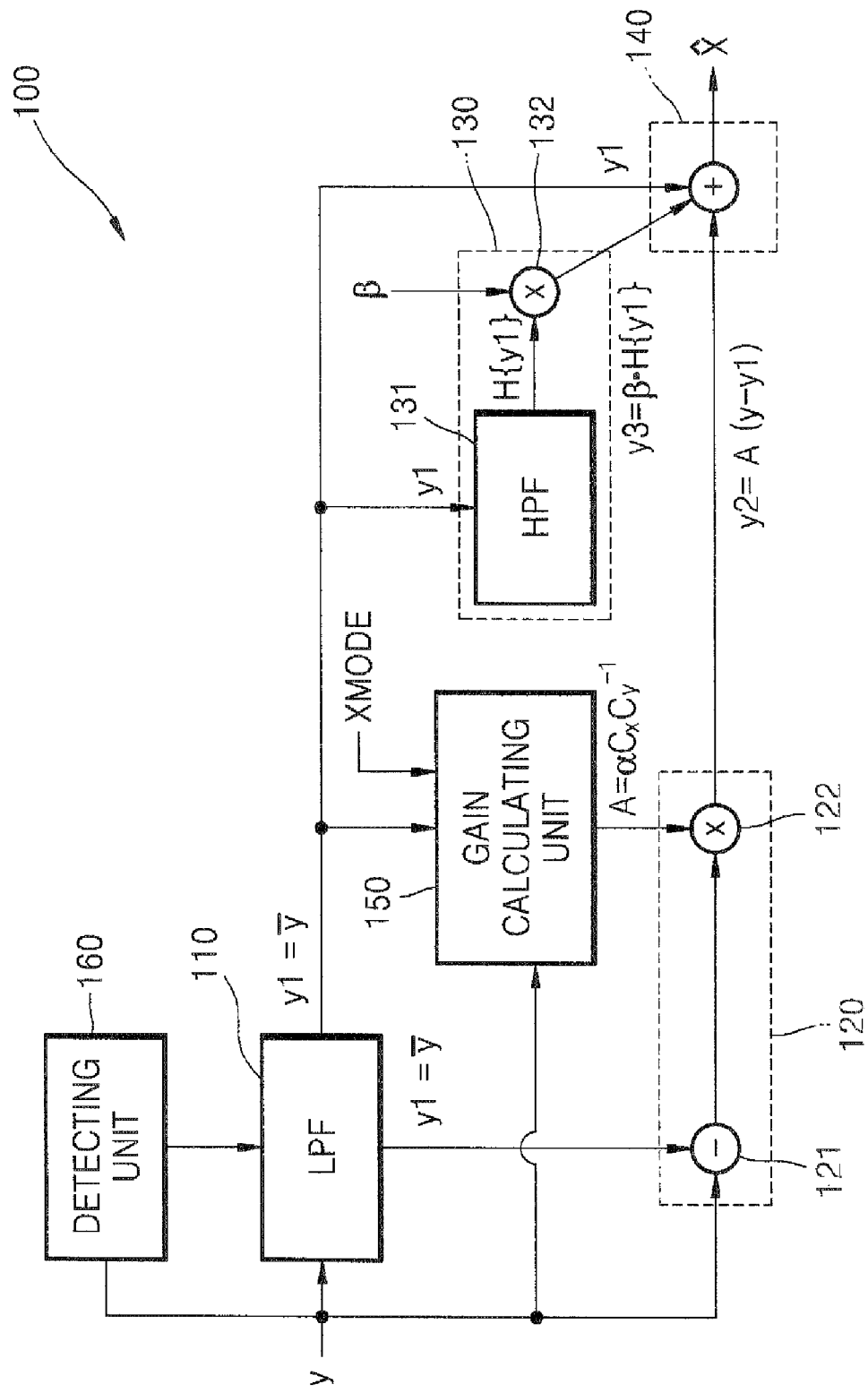
FIG. 2 illustrates a circuit diagram of a post-processing circuit for processing an image signal based on frequency components of an image signal according to an exemplary embodiment of the present invention.

FIG. 2 illustrates a circuit diagram of a post-processing circuit 100 for appropriately processing an image signal y according to an exemplary embodiment of the present invention.

Figure 3:
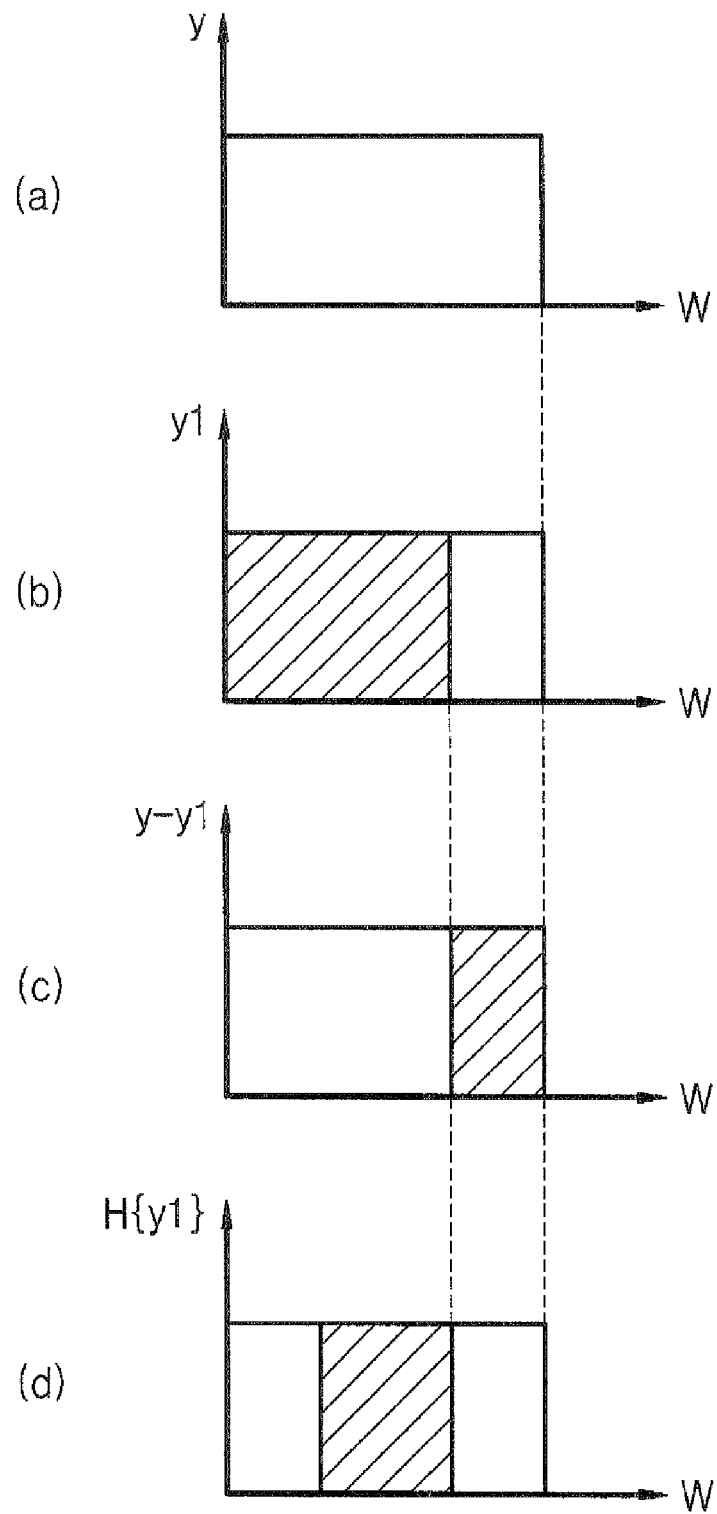
FIG. 3 illustrates frequency components of an image signal processed by the post-processing circuit in FIG. 2.

FIG. 3 illustrates frequency components of the image signal y processed by the post-processing circuit 100 of FIG. 2.

Referring to FIGS. 2 and 3, the post-processing circuit 100 includes a low-frequency extracting unit 110 in the form of a low-pass filter, a high-frequency extracting unit 120, an intermediate-frequency extracting unit 130, and an adder 140.

The post-processing circuit 100 receives the image signal y as shown at (a) in FIG. 3. The image signal y includes an original signal and noise components. The image signal y may be expressed through Equation 1.

$$y = y_0 + n \qquad \text{Equation 1}$$

Herein, $y_0$ denotes the original signal and n denotes the noise components.

The low-frequency extracting unit 110 outputs the low-frequency image components of the image signal y as a low-frequency signal y1. The low-frequency signal y1 that is generated is shown at (b) as a hatched block in FIG. 3. The low-frequency extracting unit 110 may be a low-pass filter.

Figure 1A:
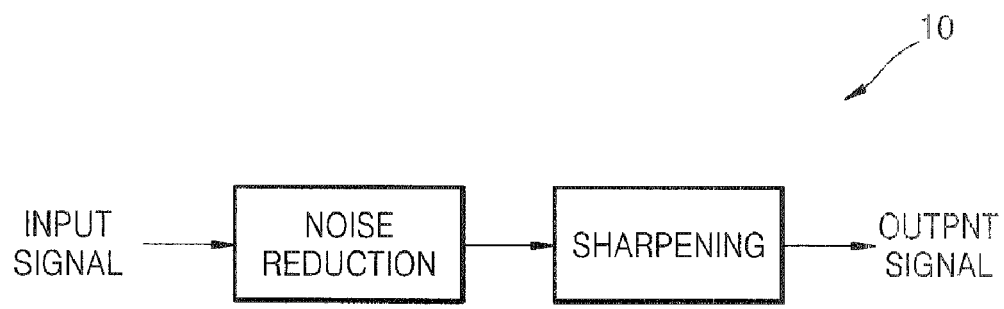
FIGS. 1A and 1B illustrate block diagrams of conventional post-processing circuits for eliminating noise from an image signal and sharpening an image corresponding to the image signal.
Figure 1B:
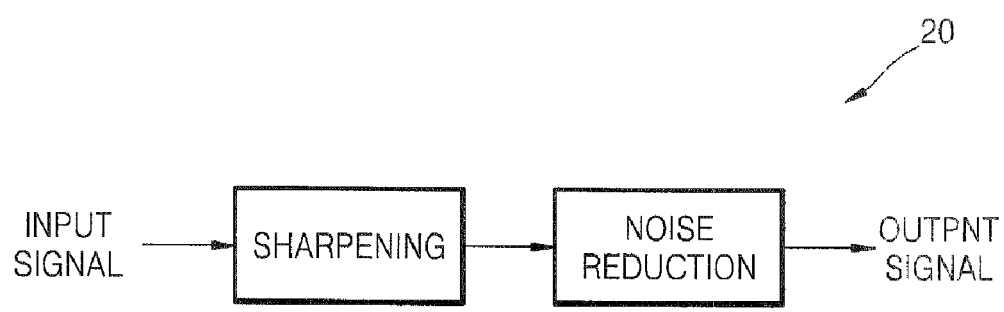

The low-frequency extracting unit 110 of FIG. 2 performs an operation equivalent to the noise reduction block in FIGS. 1A and 1B. The low-frequency extracting unit 110, however, may be operated accordingly in a post-processing mode of the image signal y by using different filter coefficients. Such an operation of the low-frequency extracting unit 110 will be described hereinbelow.

The high-frequency extracting unit 120 multiplies a first gain A by a high-frequency image component y−y1 of the image signal and outputs the product of the multiplication as a high-frequency signal y2. The high-frequency extracting unit 120 includes a subtractor 121 and a multiplier 122.

The subtractor 121 extracts the high-frequency image component y−y1 of the image signal by subtracting the low-frequency signal y1 from the image signal y. The high-frequency image component y−y1 of the image signal is shown at (c) in FIG. 3. The multiplier 122 multiplies the high-frequency image component y−y1 of the image signal by a first gain A and outputs the multiplication product as the high-frequency signal y2.

The high-frequency extracting unit 120 maintains the high-frequency image component y−y1 of the image signal to have a size corresponding to the first gate A. That is, the size of the high-frequency image signal y−y1 is determined in accordance with the first gain A.

The first gain A is set according to the pixels in a spatial domain of the image signal y. The first gain A may be set differently depending on the post-processing mode of the image signal y.

The post-processing mode of the image signal y is one of a first mode that eliminates noise of the image signal y and a second node that performs a deblocking/deringing on the image signal y.

The post-processing circuit 100 shown in FIG. 2 further includes a gain calculating unit 150 for outputting different values of the first gain A depending on the post-processing mode of the image signal y. The gain calculating unit 150 includes a multiplexer (not shown) for selecting the first gain A corresponding to the selected post-processing mode, such as the first mode or the second mode.

The gain calculating unit 150 outputs different values of the first gain A depending on the post-processing mode of the image signal y in response to a mode selection signal XMODE fed thereto. The mode selection signal XMODE assigns the second mode when the post-processing circuit 100 receives an image signal y that has been compressed by a block-DCT (block-discrete cosine transform).

Figure 4A:
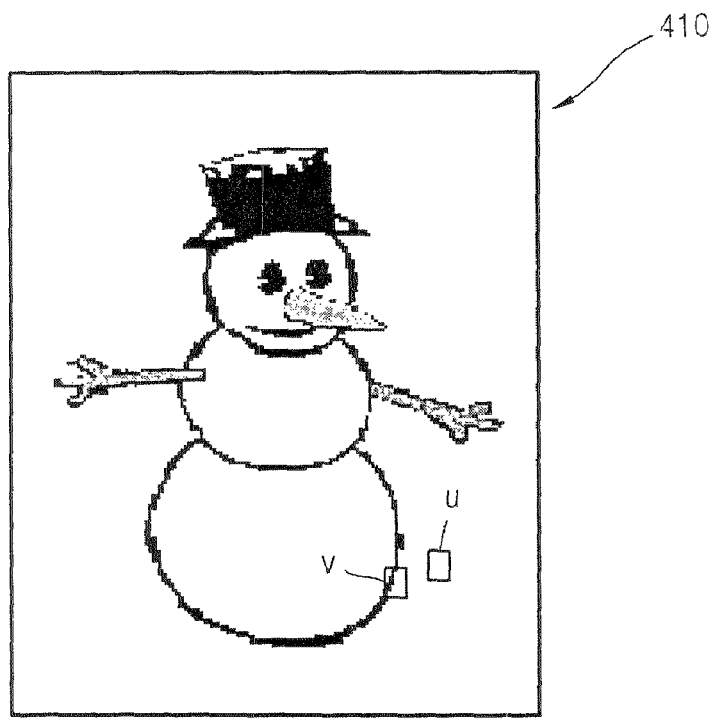
FIGS. 4A and 4B views illustrating pixels in a spatial domain.
Figure 4B:
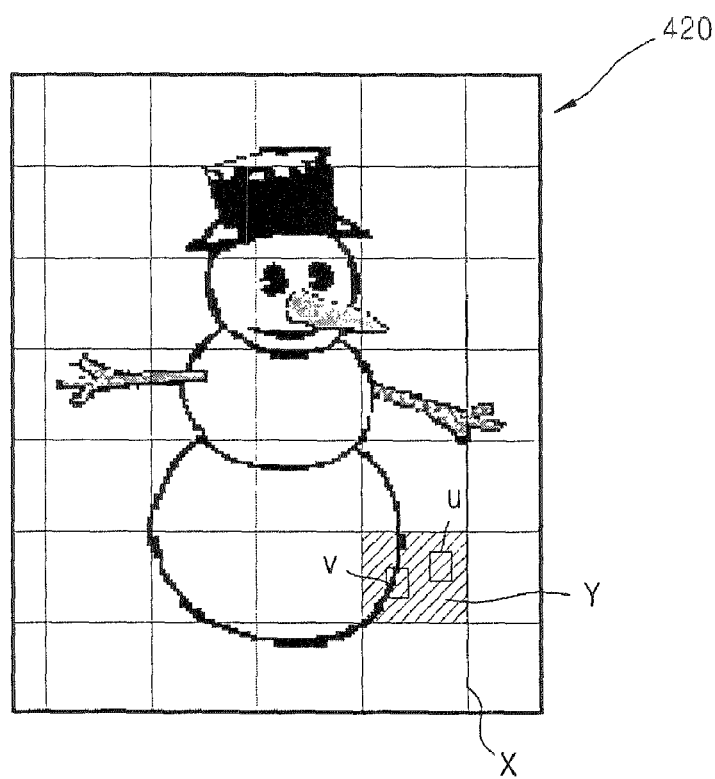

FIGS. 4A and 4B are views illustrating pixels located in a spatial domain 410.

Referring to FIGS. 2 and 4A, the image signal y may be an image signal for a pixel U in a flat region of the spatial domain 410 or another image signal for a pixel V in a fine region of the spatial domain 410 in the first mode.

If the image signal y is the image signal for the pixel U, a small value is assigned to the first gain A. The image signal for the pixel U means that a noise component in the high-frequency image component y−y1 of the image signal y is greater than the energy of the high-frequency component of the original signal.

On the other hand, if the image signal y is the image signal for the pixel V, a large value is assigned to the first gain A. The image signal for the pixel V means that a noise component in the high-frequency image component y−y1 of the image signal y is less than the energy of the high-frequency component of the original signal.

Thus, a sharpening process is not a main concern for the pixel U located in the flat region of the spatial domain 410. The pixel U, however, located in the flat region of the spatial domain 410 requires noise elimination. Therefore, if a value approximately equal to zero is assigned to the first gain A, the high-frequency image component y−y1 of the image signal will also have a value approximately equal to zero. Therefore, noise is eliminated from the image signal y for the pixel U, and the noise eliminated image signal is displayed.

On the other hand, the pixel V located in the fine region of the spatial domain 410 requires the sharpening process rather than noise elimination. Therefore, a value approximately equal to 1 is assigned to the first gain A. Therefore, the image signal y for the pixel V is sharply displayed, while the high-frequency image component y−y1 of the image is maintained constant.

In an exemplary embodiment of the present embodiment, the fine region of the spatial domain 410 may be an edge region of the spatial domain 410.

Referring to FIGS. 2 and 4B, the image signal y in the second mode may be an image signal for a pixel on a block boundary X in the spatial domain 420 or an image signal for a pixel within the block boundary Y in the spatial domain 420. As described above, the image signal in the second mode is a signal that has been compressed by the block-DCT.

If the image signal y is an image signal for the pixel on a block boundary X, a small value is assigned to the first gain A. In this case, the first gain A may be zero. If the first gain A is zero in the second mode, the high-frequency image component y−y1 of the image signal is eliminated such that the blocking caused by the block boundary is reduced.

On the other hand, if the image signal y is an image signal for a pixel within the block Y, the post-processing circuit 100 must eliminate a ringing artifact as well as sharpen the image corresponding to the image signal y. Therefore, if the image signal y is an image signal for the pixel within the block Y, the first gain A is set equal to the first gain A as in the first mode. Thus, the sharpness of the image signal y is improved while the high-frequency component y−y1 is maintained constant by setting the first gain A with the same value as the first gain A in the first mode. In the exemplary embodiment, the ringing artifact having a relatively low energy is also eliminated. The pixels U, V within the block Y shown in FIG. 4B and the pixel U, V shown in FIG. 4A are processed by the same method.

Referring again to FIG. 2, the post-processing circuit 100 further includes a detecting unit 160 for determining whether the image signal y is a signal for a pixel on the block boundary X or the image signal y is a signal for a pixel in a region within the block Y.

As described above, the low-frequency extracting unit 110 is a low-pass filter. The low-frequency extracting unit 110 eliminates high-frequency noise of the image signed y in the first mode. In the exemplary embodiment, the low-frequency extracting unit 110 uses a filter coefficient that maintains the edge component of the image signal y constant, where the edge component of the image signal y is denoted as the pixel V in FIGS. 4A and 4B.

That is, the low-frequency extracting unit 110 uses a filter coefficient that does not blur the edge components of the image signal y such as for the pixel V shown in FIGS. 4A and 4B, even when high-frequency noise of the image signal is removed.

Referring again to FIGS. 2 and 4B, the low-frequency extracting unit 110 uses different filter coefficients depending on the image signal for a pixel in the spatial domain in the second mode. The low-frequency extracting unit 110 uses a filter coefficient that highly smoothes the image signal when the image signal y is for a pixel located on the block boundary X.

On the other hand, the low-frequency extracting unit 110 uses a filter coefficient that filters the image signal y for a pixel V within the block Y of the fine region of the spatial domain 420, which is an edge region of the spatial domain 410 where the pixel V is located.

That is, the low-frequency extracting unit 110 filters an image in a region inside of the block boundary to be appropriately processed according to an edge.

Referring to FIGS. 2 and 3 again, the intermediate-frequency extracting unit 130 multiplies an intermediate-frequency image component H(y1) of the image signal y by a second gain β and outputs an intermediate-frequency signal y3. The intermediate-frequency extracting unit 130 sharpens the image corresponding to the image signal y.

The intermediate-frequency extracting unit 130 includes a high-pass filter 131 and a multiplier 132 for sharpening the image corresponding to the image signal y. The high-pass filter 131 outputs the intermediate-frequency image component H(y1) of the image signal y by high-pass filtering the low-frequency signal y1. The intermediate-frequency image component H(y1) of the image signal y is shown as a hatched block at (d) in FIG. 3. The multiplier 132 multiplies the intermediate-frequency image component H(y1) of the image signal y by a second gain β and outputs the multiplication product as the intermediate-frequency signal y3.

Different values are assigned to the second gain β depending on whether the sharpness of the image signal y needs to be improved or not. That is, a user may appropriately assign an exact value or different values to the second gain β according to the pixels requiring the sharpening process.

In appropriately setting the second gain β, the second gain β may be set to be proportional to the first gain A. If the frequency band of the image signal y is a low-frequency band, the small value assigned to the second gain β is the same as the small value of the first gain A. On the other hand, if the frequency band of the image signal y is a high-frequency band, a large value assigned to the second gain β is the same as the small value of the first gain. Therefore, the sharpness of the image is effectively improved.

In appropriately setting the second gain β according to the pixels, the second gain β may be set in order to prevent a sharpening artifact. Generally, the resultant image from the sharpening process includes a white-band artifact generated in a region having a large gap between the pixels and a step artifact generated on a diagonal edge. Therefore, the generation of these artifacts can be prevented by assigning a small value to the second gain β for a pixel where these artifacts may be generated.

The adder 140 outputs the post-processed signal obtained by adding the low-frequency signal y1, the high-frequency signal y2, and the intermediate-frequency signal y3.

Such a post-processing operation of the post-processing circuit 100 may be expressed through the following Equation 2.

$$\acute{x}(i,j) = \bar{y}(i,j) + A(i,j) \cdot \{y(i,j) - \bar{y}(i,j)\} + \beta(i,j) \cdot H\{\bar{y}(i,j)\} \quad \text{Equation 2}$$

In Equation 2, y(i,j) denotes an a (i,j)$^{th}$ pixel of the image signal y, and $\bar{y}$(i,j) denotes an a (i,j)$^{th}$ pixel of the low-frequency signal y1. A(i,j) and β(i,j) denote a first gain of the a (i,j)$^{th}$ pixel and a second gain of the a(i,j)$^{th}$ pixel, and H{} denotes a high-pass filter.

That is, the post-processing circuit 100, according to the exemplary embodiment, appropriately processes the low-frequency image component, the high-frequency image components y−y1 of the image signal and the intermediate frequency component by setting the first gain A and the second gain β differently according to the frequency components of the image signal.

The first gain A(i,j) may be set based on the following Equation 3.

$$A(i,j) = a \cdot \frac{E_y(i,j) - E_n(i,j)}{E_y(i,j)} \quad \text{Equation 3}$$

In Equation 3, α is a constant, $E_y$(i,j) denotes the energy of the high-frequency components of y(i,j), and $E_n$(i,j) denotes the energy of the noise components. $E_y$(i,j) has a comparatively greater value than $E_n$(i,j) in the edge region of the image signal. Therefore, the first gain A(i,j) has a value approximately equal to the constant α. On the other hand, when $E_y$(i,j) has a value approximately equal to $E_n$(i,j) for the image signal for a pixel in the flat region of the spatial domain, the first gain A(i,j) has a value approximately equal to zero.

The constant α may be a value of 1 one to all of the pixels, but a value less than 1 may be assigned to the constant α when noise elimination is a main concern. On the other hand, a value greater than 1 may be assigned to the constant α when the sharpening process is a main concern in the post-processing circuit.

The second gain β may set to a constant value for all of the pixels, or the second gain β may be set according to Equation 3. The second gain β may be set with a value so as to not generate the white artifact or the step artifact by measuring a brightness-variation of the corresponding pixel in the spatial domain.

Therefore, a stable post-processing result can be obtained by effectively performing the noise elimination process and the sharpening process. Also, the image signal can be processed according to various post-processing modes with a single circuit structure of the post-processing circuit 100 by differently setting $\bar{y}$(i, j) and the first and second gains A and β.

As described above, the post-processing circuit 100, according to an exemplary embodiment of the present invention, provides a stable post-processing result by effectively performing the noise elimination process and the sharpening process. Also, the post-processing circuit 100, according to an exemplary embodiment of the present invention, appropriately processes the image signal according to a plurality of post-processing modes with a single circuit design.

While the present invention has been particularly shown and described with reference to the exemplary embodiments thereof, it will be understood by those of ordinary skill in the art that various changes in form and details may be made therein without departing from the spirit and scope of the present invention, as defined by the following claims.

What is claimed is:

1. A post-processing circuit for processing an image signal formed of an original signal and noise components, the circuit comprising:
    a low-frequency extracting unit outputting a low-frequency image component of the image signal as a low-frequency signal;
    a high-frequency extracting unit multiplying a high-frequency image component of the image signal by a first gain and outputting the multiplication product as a high-frequency signal;
    an intermediate-frequency extracting unit multiplying an intermediate-frequency image component of the image signal by a second gain and outputting the multiplication product as an intermediate-frequency signal; and
    an adder adding the low-frequency signal, the high-frequency signal and the intermediate-frequency signal and outputting the addition sum as a post-processed signal,
    wherein the first gain and the second gain are set differently according to a pixel location in a spatial domain, and
    wherein the first gain is set to a first value that decreases the high-frequency image component if the energy of a noise component in a high-frequency image component is larger than an energy of a high-frequency component of the original signal, or the first gain is set to a second value that increases the high-frequency image component if an energy of the noise component is less than an energy of the high-frequency component of the original signal.

2. The post-processing circuit of claim 1, wherein the image signal is an image signal for a pixel in a flat region of the spatial domain.

3. The post-processing circuit of claim 1, wherein the image signal is an image signal for a pixel in a fine region of the spatial domain.

4. The post-processing circuit of claim 1, further comprising a gain calculating unit for calculating the first gain.

5. The post-processing circuit of claim 1, wherein the high-frequency extracting unit preserves the high-frequency image component to have a size corresponding to the first gain.

6. The post-processing circuit of claim 5, wherein the high-frequency extracting unit includes:
   a subtractor extracting the high-frequency image component by subtracting the low-frequency signal from the image signal; and
   a multiplier outputting the high-frequency signal by multiplying the high-frequency image component by the first gain.

7. The post-processing circuit of claim 1, wherein the second gain is set to minimize a sharpening artifact of the image signal.

8. The post-processing circuit of claim 7, wherein the second gain is one of set to a constant and adaptively set to the pixel.

9. The post-processing circuit of claim 8, wherein the second gain is set to be proportional to the first gain if the second gain is adaptively set to the pixel.

10. The post-processing circuit of claim 1, wherein the intermediate-frequency extracting unit sharpens the image signal.

11. The post-processing circuit of claim 10, wherein the intermediate-frequency extracting unit includes:
    a high-pass filter outputting the intermediate-frequency image component by high-pass filtering the low-frequency signal; and
    a multiplier outputting the intermediate-frequency signal by multiplying the intermediate-frequency image component by the second gain.

12. The post-processing circuit of claim 1, wherein the low-frequency extracting unit eliminates high-frequency noise of the image signal.

13. The post-processing circuit of claim 12, wherein the low-frequency extracting unit comprises a low-pass filter.

14. The post-processing circuit of claim 13, wherein the low-pass filter uses a filter coefficient that maintains a fine component of the image signal.

15. The post-processing circuit of claim 14, wherein the filter coefficient is one of a constant coefficient and an adaptive coefficient on the pixel.

16. A post-processing circuit for processing an image signal formed of an original signal and noise components, the circuit comprising:
    a low-frequency extracting unit outputting a low-frequency image component of the image signal as a low-frequency signal;
    a high-frequency extracting unit multiplying a high-frequency image component of the image signal by a first gain and outputting the multiplication product as a high-frequency signal; and
    an adder adding the low-frequency signal and the high-frequency signal, and outputting the addition sum as a post-processed signal,
    wherein the first gain is set differently depending upon a post-processing mode of the image signal and a pixel location in a spatial domain, and
    wherein the post-processing mode of the image signal is one of a first mode for eliminating noise of the image signal and a second mode for deblocking/deringing of the image signal.

17. The post-processing circuit of claim 16, further comprising a gain calculating unit for outputting a first gain corresponding to one of the first mode and the second mode in response to a mode selection signal.

18. The post-processing circuit of claim 17, wherein the gain calculating unit includes a multiplexer.

19. The post-processing circuit of claim 17, wherein the first gain is set to a first value that decreases the high-frequency image component, in the first mode if an energy of a noise component in a high-frequency image component is larger than an energy of a high-frequency component of the original signal.

20. The post-processing circuit of claim 19, wherein the image signal is an image signal for a pixel in a flat region of the spatial domain.

21. The post-processing circuit of claim 17, wherein the first gain is set to a second value that increases the high-frequency image component in the first mode if an energy of the noise component is less than an energy of the high-frequency component of the original signal.

22. The post-processing circuit of claim 21, wherein the image signal is an image signal for a pixel in a fine region of the spatial domain.

23. The post-processing circuit of claim 17, wherein the mode selection signal selects the second mode if the image signal is compressed by a block-DCT (block-discrete cosine transform).

24. The post-processing circuit of claim 23, wherein the image signal in the second mode is an image signal for a pixel on or inside a block boundary in the spatial domain.

25. The post-processing circuit of claim 24, wherein the first gain is set to a first value that decreases the high-frequency image component, if the image signal is an image signal for a pixel on the block boundary.

26. The post-processing circuit of claim 25, wherein the first gain is zero.

27. The post-processing circuit of claim 24, wherein the first gain is set equal to the first gain in the first mode if the image signal is an image signal for a pixel inside the block boundary.

28. The post-processing circuit of claim 24, further comprising a detecting unit for determining whether the image signal is an image signal for a pixel on the block boundary or an image signal for a pixel in the inside region of the block boundary.

29. The post-processing circuit of claim 16, wherein the high-frequency extracting unit preserves the high-frequency image component of the image signal to have a size corresponding to the first gain.

30. The post-processing circuit of claim 29, wherein the high-frequency extracting unit includes:
    a subtractor extracting the high-frequency image component by subtracting the low-frequency signal from the image signal; and
    a multiplier outputting the high-frequency signal by multiplying the high-frequency image component by the first gain.

31. The post-processing circuit of claim 16, wherein the low-frequency extracting unit comprises a low-pass filter.

32. The post-processing circuit of claim 31, wherein the low-pass filter eliminates high-frequency noise of the image signal if the post-processing mode is the first mode.

33. The post-processing circuit of claim 32, wherein the low-pass filter uses a filter coefficient that maintains a fine component of the image signal.

34. The post-processing circuit of claim 31, wherein the low-pass filter uses a filter coefficient that is an adaptive coefficient on a pixel in a spatial domain when the post-processing mode is the second mode.

35. The post-processing circuit of claim 34, wherein the image signal is an image signal for a pixel on or inside a block boundary in the spatial domain when the image signal is compressed by a block-DCT (block-discrete cosine transform).

36. The post-processing circuit of claim 35, wherein the low-pass filter uses a filter coefficient that highly smoothes the image signal when the image signal is an image signal for a pixel on the block boundary.

37. The post-processing circuit of claim 36, wherein the low-pass filter uses a filter coefficient that causes the image signal to not cross a fine region of the spatial domain if the image signal is for a pixel inside the block boundary.

38. The post-processing circuit of claim 31, wherein the low-pass filter uses a filter coefficient that is one of a constant coefficient and an adaptive coefficient on the pixel.

39. The post-processing circuit of claim 16, further comprising an intermediate-frequency extracting unit multiplying an intermediate-frequency image component of the image signal by a second gain and outputting the multiplication product as an intermediate-frequency signal.

40. The post-processing circuit of claim 39, wherein the intermediate-frequency extracting unit sharpens the image signal.

41. The post-processing circuit of claim 39, wherein the intermediate-frequency extracting unit includes:
    a high-pass filter outputting the intermediate-frequency image component by high-pass filtering the low-frequency signal; and
    a multiplier outputting the intermediate-frequency signal by multiplying the second gain with the intermediate-frequency image component.

42. The post-processing circuit of claim 39, wherein the second gain minimizes a sharpening artifact of the image signal.

43. The post-processing circuit of claim 42, wherein the low-frequency extracting unit comprises a low-pass filter that uses a filter coefficient that is one of a constant coefficient and an adaptive coefficient on the pixel.

44. The post-processing circuit of claim 43, wherein the second gain is set to be proportional to the first gain when the second gain is set adaptively to the pixel.

45. The post-processing circuit of claim 39, wherein the adder adds the intermediate-frequency signal to the sum of the low-frequency signal and the high-frequency signal.

46. A post-processing circuit for processing an image signal formed of an original signal and noise components, the circuit comprising:
    a low-frequency extracting unit outputting a low-frequency image component of the image signal as a low-frequency signal;
    a high-frequency extracting unit multiplying a high-frequency image component of the image signal by a first gain and outputting the multiplication product as a high-frequency signal;
    an intermediate-frequency extracting unit multiplying an intermediate-frequency image component of the image signal by a second gain and outputting the multiplication product as an intermediate-frequency signal; and
    an adder adding the low-frequency signal, the high-frequency signal and the intermediate-frequency signal and outputting the addition sum as a post-processed signal,
    wherein the first gain and the second gain are set differently according to a pixel location in a spatial domain, the second gain is set to minimize a sharpening artifact of the image signal, the second gain is one of set to a constant and adaptively set to the pixel, and the second gain is set to be proportional to the first gain if the second gain is adaptively set to the pixel.

* * * * *